United States Patent
Cheng et al.

(10) Patent No.: US 12,538,310 B2
(45) Date of Patent: Jan. 27, 2026

(54) TECHNIQUES FOR RADIO RESOURCE MANAGEMENT (RRM) IN SIDELINK WIRELESS COMMUNICATIONS

(71) Applicant: QUALCOMM Incorporated, San Diego, CA (US)

(72) Inventors: Peng Cheng, Beijing (CN); Karthika Paladugu, San Diego, CA (US); Gavin Bernard Horn, La Jolla, CA (US); Punyaslok Purkayastha, San Diego, CA (US); Dan Vassilovski, Del Mar, CA (US); Hong Cheng, Basking Ridge, NJ (US); Rajat Prakash, San Diego, CA (US)

(*) Notice: Subject to any disclaimer, the term of this patent is extended or adjusted under 35 U.S.C. 154(b) by 568 days.

(21) Appl. No.: 17/788,640

(22) PCT Filed: Dec. 28, 2020

(86) PCT No.: PCT/CN2020/140035
§ 371 (c)(1),
(2) Date: Jun. 23, 2022

(87) PCT Pub. No.: WO2021/136154
PCT Pub. Date: Jul. 8, 2021

(65) Prior Publication Data
US 2023/0031588 A1 Feb. 2, 2023

(30) Foreign Application Priority Data
Dec. 30, 2019 (WO) ............... PCT/CN2019/129752

(51) Int. Cl.
*H04W 24/10* (2009.01)
*H04L 5/00* (2006.01)
(Continued)

(52) U.S. Cl.
CPC ......... *H04W 72/20* (2023.01); *H04W 36/033* (2023.05); *H04W 92/18* (2013.01)

(58) Field of Classification Search
None
See application file for complete search history.

(56) References Cited

U.S. PATENT DOCUMENTS 10,501,483 B2 * 12/2019 Dinh .................... C07D 471/10
11,304,102 B2 * 4/2022 Tseng ................ H04W 74/0808
(Continued)

FOREIGN PATENT DOCUMENTS

| CN | 105794298 A | 7/2016 |
|---|---|---|
| CN | 107852727 A | 3/2018 |

(Continued)

OTHER PUBLICATIONS

OPPO: "Correction for Sidelink Measurement Periodical Triggering Condition", 3GPP TSG-RAN WG2 Meeting#103bis, 36331_CR3543, R2-1813569, 3rd Generation Partnership Project, Mobile Competence Centre, 650, Route Des Lucioles, vol. RAN WG2, No. Chengdu, China, Oct. 8, 2018-Oct. 12, 2018, Sep. 28, 2018, 7 Pages, XP051504294, pp. 2-3.

(Continued)

*Primary Examiner* — Sithu Ko

(57) ABSTRACT

Some aspects described herein relate to receiving and/or forwarding radio resource management (RRM) configurations for sidelink reporting, as well as measuring sidelink signals and generating measurement reports for reporting to the network.

14 Claims, 9 Drawing Sheets

(51) Int. Cl.
*H04W 36/00* (2009.01)
*H04W 72/20* (2023.01)
*H04W 92/18* (2009.01)

(56) References Cited

U.S. PATENT DOCUMENTS

| | | | | |
|---|---|---|---|---|
| 11,910,457 | B2* | 2/2024 | Chen | H04W 76/18 |
| 12,218,875 | B2* | 2/2025 | Guo | H04L 5/0051 |
| 2019/0104450 | A1 | 4/2019 | Adachi | |
| 2020/0052803 | A1* | 2/2020 | Deenoo | H04W 48/12 |
| 2020/0059836 | A1* | 2/2020 | Isokangas | H04W 36/0058 |
| 2021/0045093 | A1* | 2/2021 | Rao | H04W 76/14 |
| 2021/0368372 | A1* | 11/2021 | Chen | H04W 4/70 |
| 2021/0377916 | A1* | 12/2021 | Shi | H04W 24/02 |
| 2023/0033619 | A1* | 2/2023 | Lovlekar | H04W 72/541 |

FOREIGN PATENT DOCUMENTS

| | | |
|---|---|---|
| CN | 107925897 A | 4/2018 |
| CN | 109952780 A | 6/2019 |
| EP | 3334195 A1 | 6/2018 |
| EP | 3457751 A1 | 3/2019 |
| WO | 2018201870 A1 | 11/2018 |
| WO | 2018228038 A1 | 12/2018 |

OTHER PUBLICATIONS

Supplementary European Search Report—EP20910217—Search Authority—Munich—Dec. 7, 2023.
Apple: "Summary of [104#56][NR/V2X] AS Level Link Management for Unicast", 3GPP Draft, R2-1901900, 3GPP TSG-RAN WG2 Meeting #105, 3rd Generation Partnership Project (3GPP), Mobile Competence Centre, 650, Route Des Lucioles, F-06921 Sophia-Antipolis Cedex, France, Mar. 1, 2019 (Mar. 1, 2019), XP051603249, 27 Pages, Ericsson contribute, p. 14, Q9, p. 20 ZTE Contribution, p. 21 Rapporteur Summary, p. 25 Interdigital Contribution, p. 24, Section 2.1.
Interdigital Inc: "QoS Management for NR V2X", 3GPP Draft, 3GPP RAN WG2 Meeting #106, R2-1906386, Reno, USA, May 13-17, 2019, pp. 1-4, Section 2.3.
Interdigital Inc: "RLM/RLF and RRM for NR V2X", 3GPP Draft, 3GPP RAN WG2 Meeting #105, R2-1901579, Athens, Greece, Feb. 15, 2019 (Feb. 15, 2019), XP051602934, 4 Pages, p. 4, Section 2, 4, Proposals 1. 4, the whole document.
International Search Report and Written Opinion—PCT/CN2020/140035—ISA/EPO—Mar. 15, 2021.
International Search Report and Written Opinion—PCT/CN2019/129752—ISA/EPO—Oct. 10, 2020.
ZTE Corporation, et al., "Consideration on Sidelink RRM Measurement", 3GPP TSG RAN WG2 Meeting #106, R2-1906479, Reno, USA, May 13-17, 2019, 3 Pages, section 1 and 2.

* cited by examiner

TECHNIQUES FOR RADIO RESOURCE MANAGEMENT (RRM) IN SIDELINK WIRELESS COMMUNICATIONS

CROSS-REFERENCE TO RELATED APPLICATIONS

The present Application is a 35 U.S.C. § 371 National Phase of International Patent Application No. PCT/CN2020/140035, entitled "TECHNIQUES FOR RADIO RESOURCE MANAGEMENT (RRM) IN SIDELINK WIRELESS COMMUNICATIONS" filed Dec. 28, 2020, which claims priority to International Patent Application No. PCT/CN2019/129752, entitled "TECHNIQUES FOR RADIO RESOURCE MANAGEMENT (RRM) IN SIDELINK WIRELESS COMMUNICATIONS" filed Dec. 30, 2019, both of which are assigned to the assignee hereof and hereby expressly incorporated by reference herein for all purposes.

BACKGROUND

Aspects of the present disclosure relate generally to wireless communication systems, and more particularly, to radio resource management (RRM) in wireless communication.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate over one or more of multiple interfaces. The multiple interfaces may include a Uu interface between the UE and a base station, where the UE can receive communications from the base station over a downlink and transmit communications to the base station over an uplink. In addition, the multiple interfaces may include a sidelink interface to communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving, by a first device, a radio resource measurement (RRM) configuration for measuring and reporting signals received from one or more devices in sidelink resources, measuring, based on the RRM configuration, signals received from the one or more devices, and transmitting, to a base station and based on the RRM configuration, a report of one or more signal parameters of the measured signals.

In another example, a method of wireless communication is provided that includes receiving, by a first device and from a base station, a RRM configuration for measuring and reporting signals received from one or more devices in sidelink resources, and transmitting, by the first device and to a second device over a sidelink channel, the RRM configuration.

In another example, a method for wireless communication is provided that includes transmitting a RRM configuration for measuring and reporting signals received from one or more devices in sidelink resources, and receiving, from a device and based on the RRM configuration, a report of one or more signal parameters of signals measured by the device from the one or more devices.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

In one example, an apparatus for wireless communication is provided that includes a transceiver, a memory configured to store instructions, and one or more processors communicatively coupled with the transceiver and the memory. The one or more processors are configured to receive a radio resource measurement (RRM) configuration for measuring and reporting signals received from one or more devices in sidelink resources, measure, based on the RRM configuration, signals received from the one or more devices, and transmit, to a base station and based on the RRM configuration, a report of one or more signal parameters of the measured signals.

In another example, an apparatus for wireless communication is provided that includes a transceiver, a memory configured to store instructions, and one or more processors communicatively coupled with the transceiver and the memory. The one or more processors are configured to receive, from a base station, a radio resource measurement (RRM) configuration for measuring and reporting signals received from one or more devices in sidelink resources, and transmit, to a second device over a sidelink channel, the RRM configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
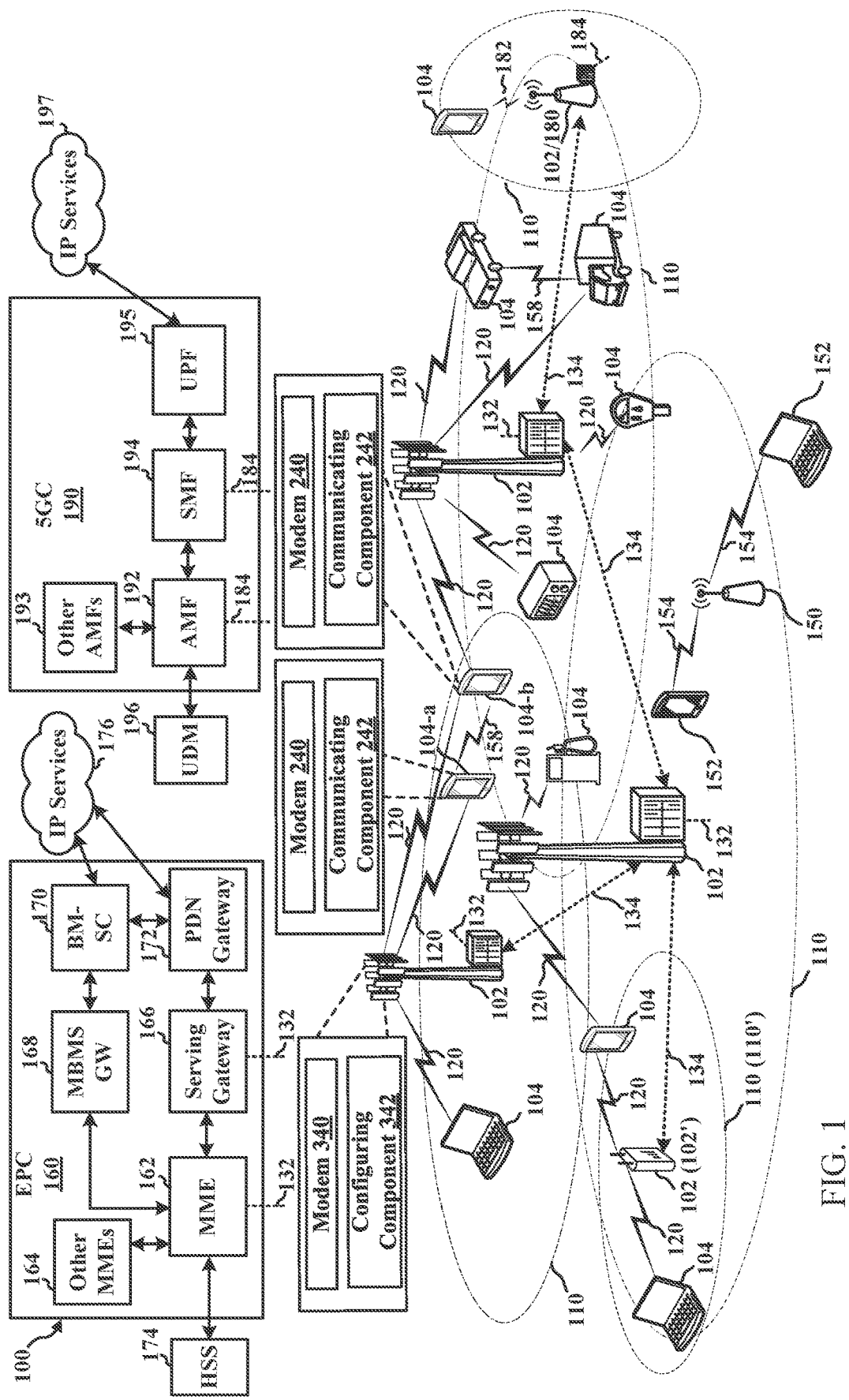
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing radio resource management (RRM) procedures for sidelink communications. For example, sidelink communications can refer to device-to-device (D2D) communication among devices (e.g., user equipment (UEs)) in a wireless network. In a specific example, sidelink communications can be defined for vehicle-based communications, such as vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a sidelink channel. Continued support and implementation of V2X communications is provided in fifth generation (5G) new radio (NR) communication technologies, as well as long term evolution (LTE). Though aspects are generally described herein in terms of D2D/V2X communications, the concepts and techniques can be similarly applied more generally to substantially any type of wireless communications.

RRM is not specified in certain D2D wireless technologies, such as ProSe defined in 3PP release 12 and/or 13 and LTE V2X, as RRM in these technologies may not be needed as there is no handover from one peer UE to another peer UE. For example, for a UE in an idle mode (e.g., radio resource control (RRC)_IDLE or RRC_INACTIVE), the UE utilizes RRM measurement results to perform cell reselection among cells of one or more base stations. For a UE in a connected mode (e.g., RRC_CONNECTED), RRM can include the UE measurement configuration and measurement reporting to enable network controlled mobility via or among cells of one or more base stations. Additionally, only broadcast may be supported in ProSe and LTE V2X, and RRM may not be applicable for a broadcasting link.

In some wireless communication technologies, such as 5G NR, sidelink signal measurements (e.g., sidelink reference signal received power (SL-RSRP)) reporting is provided for unicast for power control. In this example, for unicast receiver UEs, SL-RSRP is reported to the transmitter UE and for sidelink open loop power control for unicast for the transmitter UE, and the transmitter UE derives pathloss estimation. It is possible to also use RRM for bearer management (e.g., PC5 quality-of-service indicator (PQI) maintenance, where PC5 can be the interface defined between V2X devices), beam management, bandwidth part (BWP) management, etc.

In an example, in NR, sidelink radio bearer (SLRB) can be configured by the network (NW) (e.g., via a gNB or other base station) to UE via RRC, system information block (SIB), or pre-configured. A UE in RRC_CONNECTED mode can report the QoS information of the PC5 QoS flow to the gNB/ng-eNB (e.g., via RRC dedicated signaling), and the gNB/ng-eNB may provide SLRB configurations and configure the mapping of PC5 QoS flow to SLRB (e.g., via RRC dedicated signaling) based on the QoS information reported by the UE. For a UE in RRC_IDLE/RRC_INACTIVE mode, the gNB/ng-eNB may provide SLRB configurations and configure the PC5 QoS profile to SLRB mapping via V2X-specific SIB. When the gNB/ng-eNB initiates the transmission of a new PC5 QoS flow, it can establish the SLRB associated with the PC5 QoS profile of that flow based on SIB configuration. For an out-of-coverage (OoC) UE, SLRB configurations and the mapping of PC5 QoS profile to SLRB can be pre-configured (e.g., defined in a configured stored at the UE). When the gNB/ng-eNB initiates the transmission of a new PC5 QoS flow, the OoC UE can establish the SLRB associated with the flow based on pre-configuration.

In LTE V2X, for example, Mode 3 UEs may work only in RRC_CONNECTED mode. In this example, eNB (or other base station) can configure the UE to report the complete UE geographical location information based on periodic reporting via the existing RRC measurement report signalling. For example, eNB can configure the UE to report Channel Busy Ratio (CBR) over RRC signalling. Mode 4 UEs may work also for RRC_IDLE or OoC mode. When entering RRC_CONNECTED mode, the UE can send CBR measurement reports and location information to the eNB. RRM framework defined in LTE can be reused. For example, both CBR and location reports for mode3/4 are sent in LTE MeasurementReport message. In an example, both periodic reports and V1/V2 event triggered reports (e.g., V1 for CBR above a threshold, V2 for CBR below a threshold) can be supported.

Although inter-UE handover may not be introduced in NR sidelink, RRM for NR sidelink can still be useful. For example, RRM for NR sidelink can facilitate SLRB reconfiguration, especially for unicast link (e.g., NW can reconfigure PQI of the SLRB). RRM for NR sidelink can also facilitate resource pool optimization (e.g., NW can reconfigure resource pool allocation), carrier aggregation (CA) management (e.g., NW can reconfigure the list of component carriers (CCs) for NR sidelink), BWP management (e.g., NW can reconfigure the BWP set for NR sidelink), assistance for NW in NW controlled path selection between Uu and sidelink (SL) interfaces (e.g., control can be done by the radio access network (RAN) or Core network or another network entity (in case of industrial internet-of-things (IIOT)), reselection of resource (e.g., for Mode 4 and unicast link, where transmitter UE can reselect the resource based on RRM reports from the receiver UE), etc. For example, the Uu interface can include an interface between the UE and gNB, and the sidelink interface can include an interface between UEs.

Aspects described herein relate to performing RRM procedures for sidelink communications. In an example, the RRM procedures may also depend on a resource allocation mode used to allocate resources for communication over a sidelink channel. In a specific example, there can be different resource allocation modes for sidelink communications, including resource allocation mode 1 where an access point (e.g., gNB) schedules (via a sidelink grant to a transmitter UE) sidelink resources for a transmitter UE to transmit sidelink communications to a receiver UE, and resource allocation mode 2 where the transmitter UE can schedule specific resources, which may be received in a resource pool from the access point, for transmitting sidelink communications to the receiver UE. Resource allocations modes 1 and 2 can be as defined in 5G NR wireless communication technology.

For UEs in a connected mode in resource allocation mode 1, in one example, the network can send (e.g., via gNB) RRM configuration to a transmitter UE for transmitting to a receiver UE over a sidelink channel, and the transmitter UE can store and forward the configuration to the receiver UE. In another example, the network can send the RRM configuration directly to the receiver UE and/or can broadcast the RRM configuration to multiple UEs. In either case, the receiver UE can perform sidelink measurements (e.g., measurements of transmitter UEs) and can transmit a measurement report to the network. The network can perform additional functions based on the received measurement report, such as reconfiguration of PQI of SLRB, releasing SLRB, radio access technology (RAT)/interface reselection, Uu or SL path reselection, etc.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3PP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3PP). CDMA2000 and UMB are described in documents from an organization named "3rd Generation Partnership Project 2" (3PP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for receiving and/or forwarding RRM configurations, performing sidelink RRM measurements, etc. In addition, some nodes may have a modem 340 and configuring component 342 for configuring UEs for sidelink RRM measurements, as described herein. Though UEs 104-a and 104-b is shown as having the modem 240 and communicating component 242 and a base station 102 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-a and 104-b) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, configuring component 342 can transmit an RRM configuration, which can include one or more parameters related to performing RRM measurements over a sidelink, to one or more UEs 104. Communicating component 242 of UE 104-*a* or 104-*b* (and/or other UEs) can receive a RRM configuration for performing RRM measurements over a sidelink and/or reporting the measurements. In one example, communicating component 242 of a transmitter UE (e.g., UE 104-*a*) can forward the RRM configuration, and/or one or more parameters thereof, to one or more receiver UEs (e.g., UE 104-*b*) over a sidelink channel (e.g., over communication link 158). In another example, the receiver UE (e.g., UE 104-*b*) can receive the RRM configuration from the base station 102. A receiver UE (e.g., UE 104-*b*) can perform RRM measurements of signals received from transmitter UEs over sidelink resources, and can report the RRM measurements to the base station 102 based on the RRM configuration.

Figure 2:
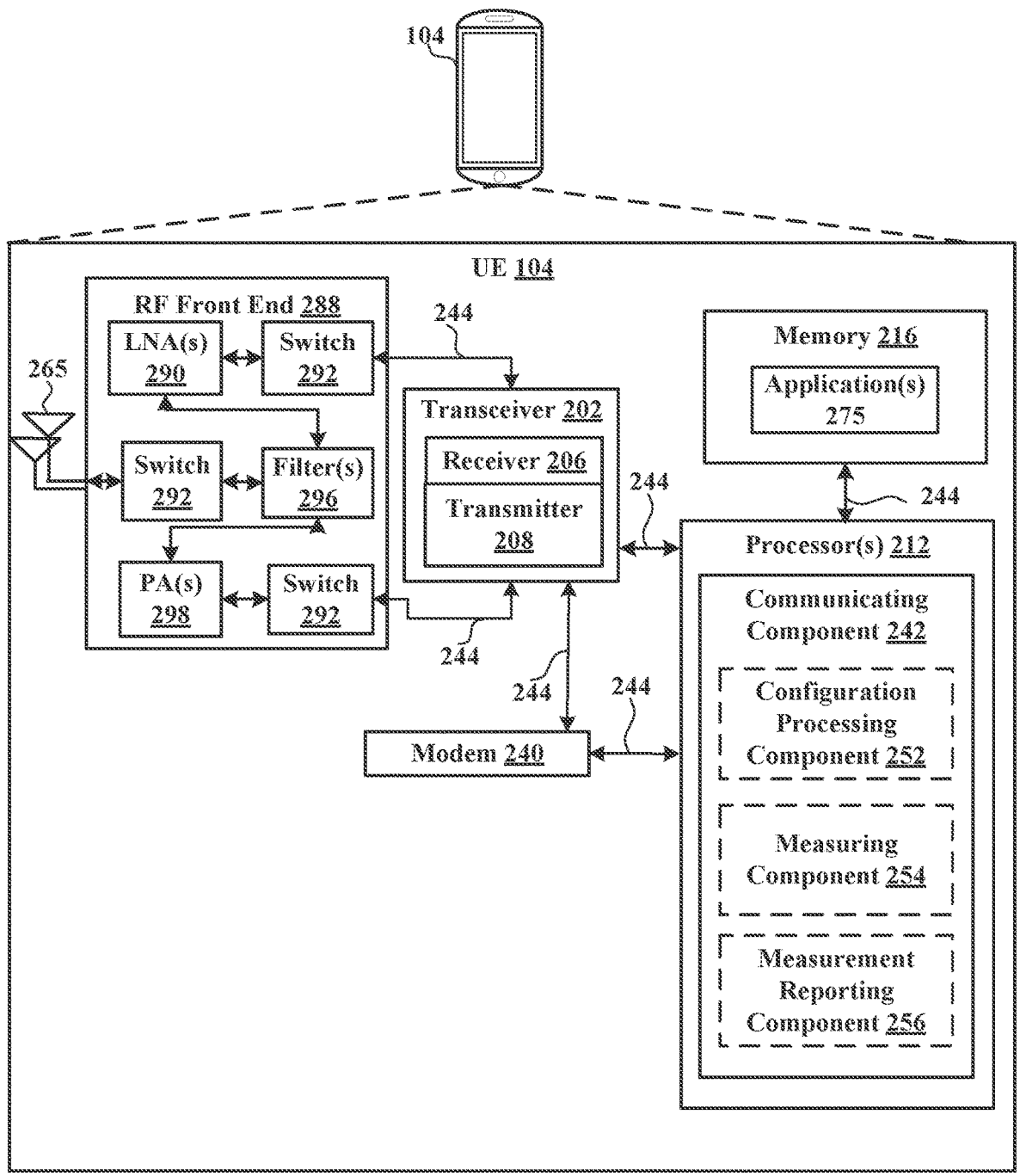
FIG. 2 is a block diagram illustrating an example of a UE, in accordance with various aspects of the present disclosure.
Figure 3:
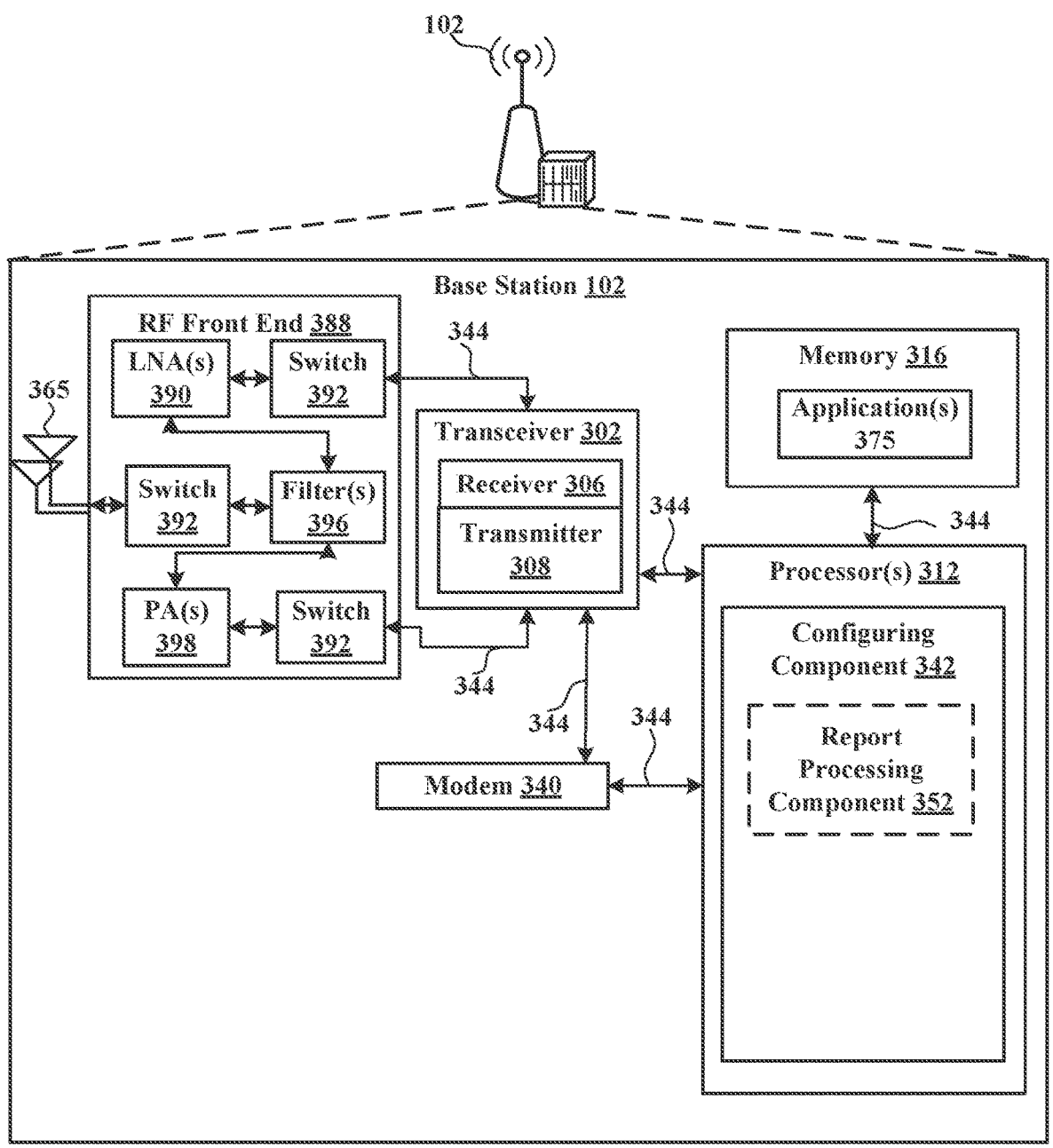
FIG. 3 is a block diagram illustrating an example of a base station, in accordance with various aspects of the present disclosure.
Figure 4:
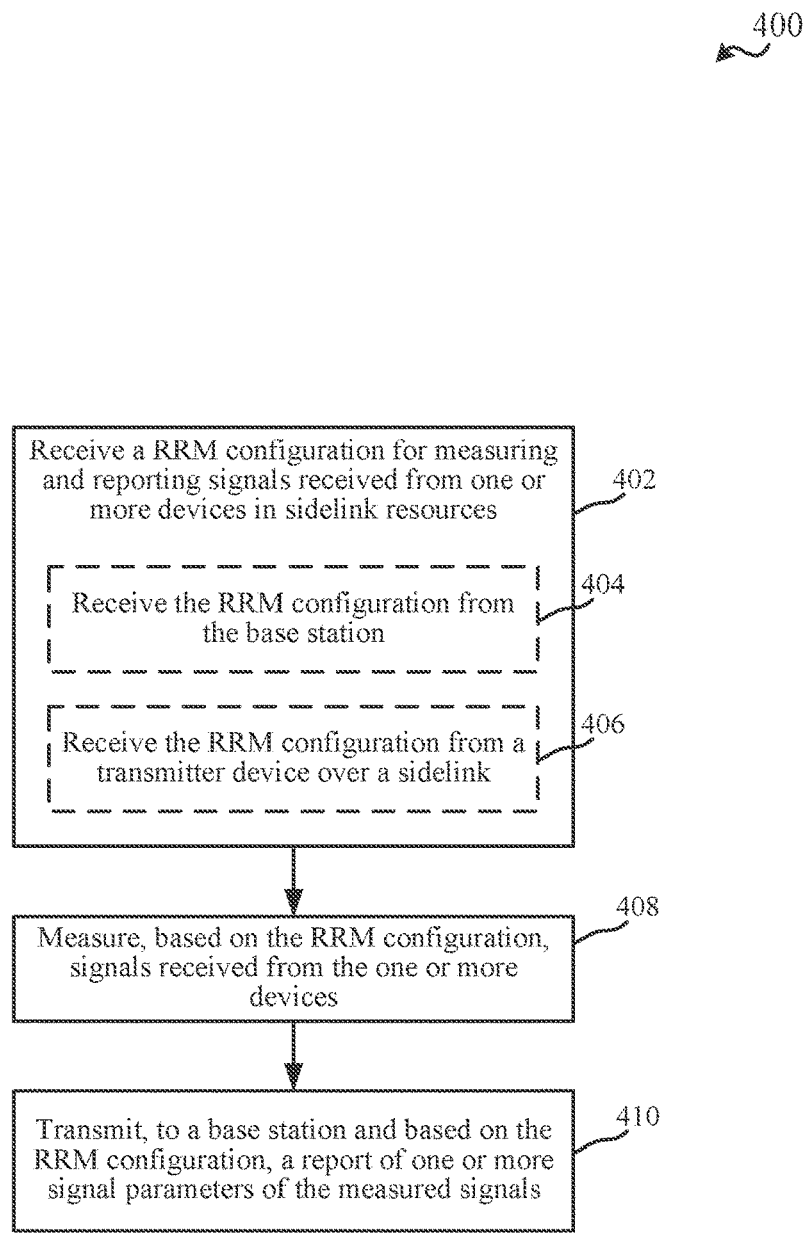
FIG. 4 is a flow chart illustrating an example of a method for measuring and reporting signals from devices over a sidelink, in accordance with various aspects of the present disclosure.
Figure 5:
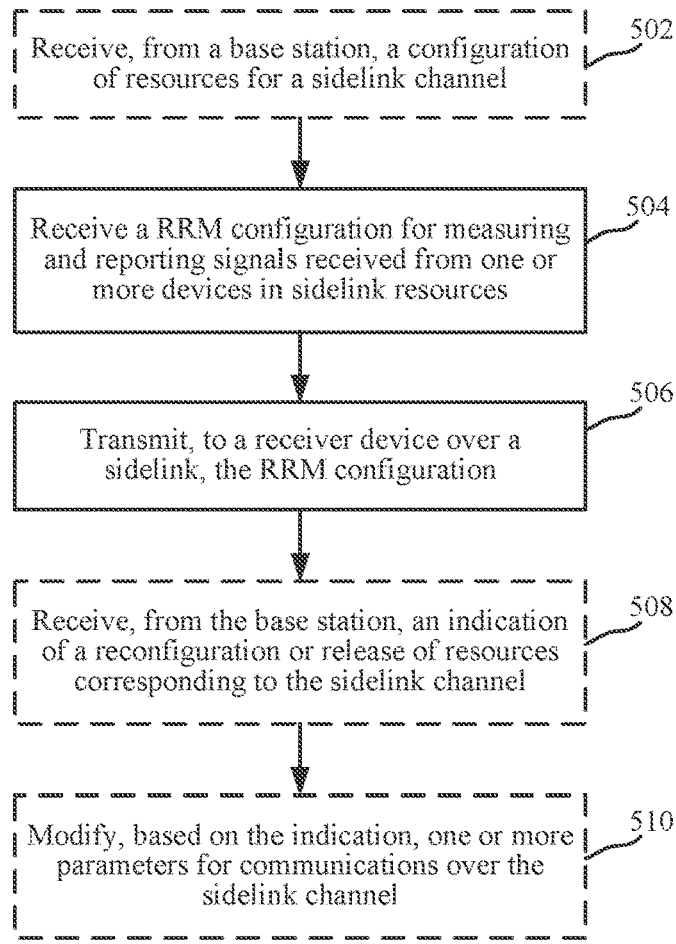
FIG. 5 is a flow chart illustrating an example of a method for forwarding a configuration of measuring and reporting signals from devices over a sidelink, in accordance with various aspects of the present disclosure.
Figure 6:
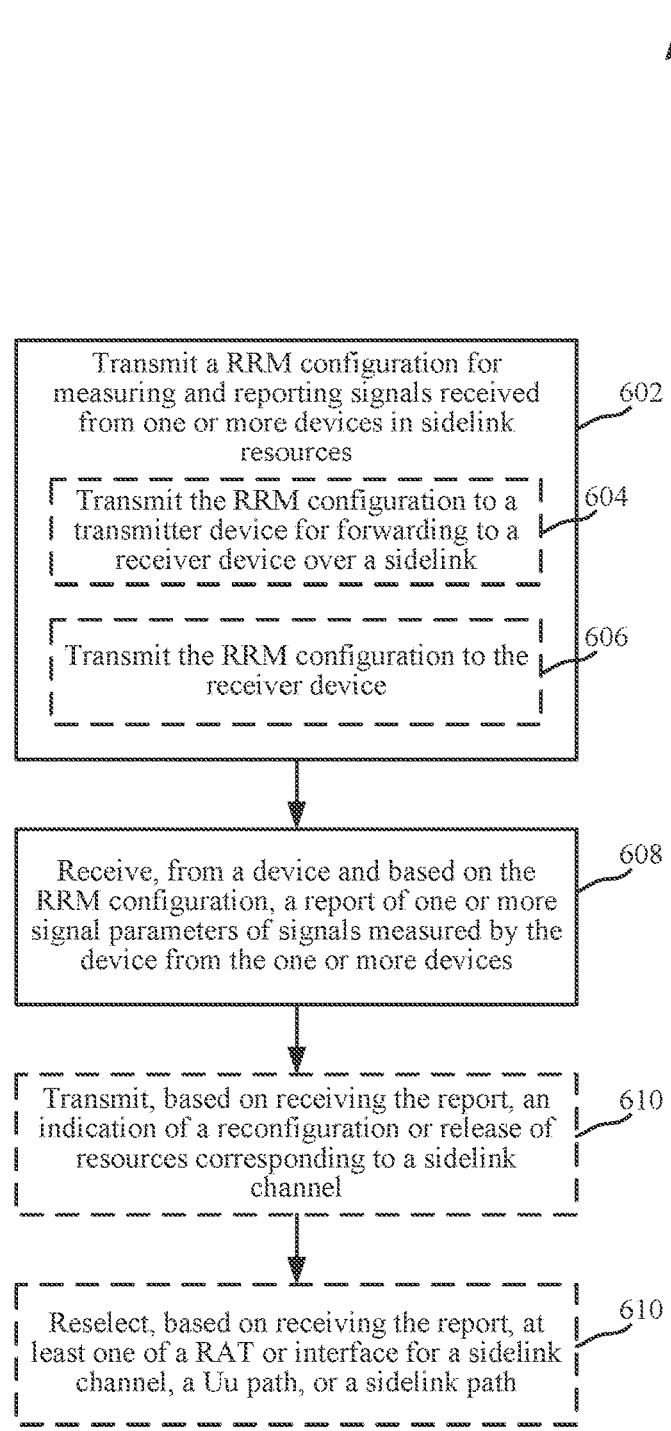
FIG. 6 is a flow chart illustrating an example of a method for receiving measurement reports of signals from devices over a sidelink, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for receiving and/or forwarding RRM configurations, performing sidelink RRM measurements, etc., as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a configuration processing component 252 for receiving an RRM configuration, forwarding an RRM configuration, etc., a measuring component 254 for measuring signals over a sidelink based on the RRM configuration, and/or a measurement reporting component 256 for generating and/or transmitting a measurement report indicating one or more parameters of the measured signals, as described herein.

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one example of an implementation of a base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring UEs for sidelink RRM measurements, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a report processing component 352 for receiving and/or processing a measurement report of RRM measurements performed on a sidelink by one or more UEs, as described herein.

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an example of a method 400 for performing RRM measurements over a sidelink. In an example, a UE (e.g., UE 104-*b*, as a receiver UE in sidelink communications) can perform the functions described in method 400 using one or more of the components described in FIGS. 1 and 2.

In method 400, at Block 402, a RRM configuration for measuring and reporting signals received from one or more devices in sidelink resources can be received. In an aspect, configuration processing component 252, e.g., in conjunction with processor(s) 212, memory 216, transceiver 202, communicating component 242, etc., can receive the RRM configuration for measuring and reporting signals received from one or more devices in sidelink resources. For example, configuration processing component 252 can receive the RRM configuration from one or more devices (e.g., from a base station 102, from other UEs 104, etc.), as described further herein. The RRM configuration may include one or more parameters related to performing measurement of other UEs over a sidelink (e.g., over frequency resources related to sidelink communications).

For example, the RRM configuration may include a periodic timer parameter for configuring periodic measurement reporting such that the UE 104 can perform measurements each time the value of the periodic timer parameter expires (e.g., based on setting a periodic timer after or upon performing measurements, after or upon transmitting a given measurement report, etc.). In addition, for example, the RRM configuration may also include a trigger condition and/or event type for event-based reporting, where the UE 104 can detect the trigger condition and/or occurrence of the event. For example, the UE 104 can detect a threshold-based trigger by comparing a measured value to a threshold specified in the RRM configuration (e.g., measuring a signal strength or quality of a signal from a transmitter UE against a threshold and determining that the measured value falls below a threshold). In some examples, an event type may correspond to measuring various thresholds, such as event types used in cell reselection. In addition, for example, the RRM configuration may also include a layer 3 (L3) filter coefficient for applying to a measurement of a cell or for a beam such that the impact of channel fading can be mitigated (e.g., making the measurement results more reliable, etc.). In addition, for example, the RRM configuration may specify a report quantity to provide in the measurement report (e.g., whether to report RSRP, reference signal received quality (RSRQ), signal-to-noise ratio (SNR), CBR, etc.).

In one example, in receiving the RRM configuration at Block 402, optionally at Block 404, the RRM configuration can be received from the base station. In an aspect, configuration processing component 252, e.g., in conjunction with processor(s) 212, memory 216, transceiver 202, communicating component 242, etc., can receive the RRM configuration from the base station (e.g., base station 102 or other network component). For example, base station 102 can transmit the RRM configuration using RRC signaling via Uu interface (e.g., in RRCReconfiguration via Uu RRC, which may include signaling radio bearer 1 (SRB1), SRB3, etc.), and configuration processing component 252 can accordingly receive the RRM configuration via the RRC signaling. In another example, base station 102 can broadcast the RRM configuration for sidelink in SIB, and configuration processing component 252 can accordingly receive the RRM configuration in the SIB broadcast by the base station 102. When the UE is a receiver UE in SL unicast connection, it can follow the measurement reporting procedure according to the RRM configuration.

In another example, in receiving the RRM configuration at Block 402, optionally at Block 406, the RRM configuration can be received from a transmitter device over a sidelink. In an aspect, configuration processing component 252, e.g., in conjunction with processor(s) 212, memory 216, transceiver 202, communicating component 242, etc., can receive the RRM configuration from the transmitter device over the sidelink. For example, the transmitter device (e.g., a different UE) can receive the RRM configuration, or at least a portion thereof, from the base station 102, as described above, and then can transmit the RRM configuration, or at least a portion thereof, to the UE 104 over the sidelink (e.g., using PC5 RRC), and configuration processing component 252 can accordingly receive the RRM configuration from the transmitter device.

In method 400, at Block 408, signals received from the one or more other devices can be measured based on the RRM configuration. In an aspect, measuring component 254, e.g., in conjunction with processor(s) 212, memory 216, transceiver 202, communicating component 242, etc., can measure, based on the RRM configuration, the signals received from the one or more devices. For example, measuring component 254 may detect one or more triggers for performing the measurements, such as expiration of a periodic timer, one or more triggers or events, as described above (e.g., based on measuring parameters against a threshold), etc. Based on determining to perform the measurements, for example, measuring component 254 can receive certain signals from other devices (e.g., other UEs) over a sidelink, such as one or more reference signals or other signals. Measuring component 254 can accordingly perform measurements of the signals from one or more other devices (which may also include the transmitter device that possibly transmitted the RRM configuration to the UE 104). Moreover, in an example, measuring component 254 can apply an L3 coefficient, specified in the configuration, to the measurement values to mitigate impact of channel fading. In yet another example, measuring component 254 can perform the measurements using the report quantities specified in the RRM configuration (e.g., RSRP, RSRQ, SNR, CBR, and/or the like).

In method 400, at Block 410, a report of one or more signal parameters of the measured signals can be transmitted to a base station. In an aspect, measurement reporting component 256, e.g., in conjunction with processor(s) 212, memory 216, transceiver 202, communicating component 242, etc., can transmit, to the base station (e.g., base station 102) and based on the RRM configuration, the report of one or more signal parameters of the measured signals. For example, measurement reporting component 256 can transmit the report to the base station 102 (e.g., the base station from which the RRM configuration is possibly received) over the Uu interface, at least for resource allocation mode 1. The UE 104 (e.g., as the receiver UE) may not need to report the measurements to the transmitter UE, as in resource allocation mode 1, the base station 102 controls resource allocation. Moreover, in an example, transmitting the report may be based on detecting the one or more triggers or events described above. In any case, based on the detected trigger, timer expiration, etc., the UE 104 (e.g., as the receiver UE) can report available measurements to the network via measurementReport message.

In any case, for example, measurement reporting component 256 can generate the report to include the values measured at Block 408 (e.g., the report quantities specified in the RRM configuration) and/or to include other parameters. For example, the other parameters may include an identifier of the transmitter UE to which the measurement values relate. In another example, the other parameters may include the measurement quantities, such as available cell RSRP, RSRQ, SINR, CBR, or available beam RSRP, RSRQ, SINR, etc. related to transmitter UE. In another example, the other parameters may include a CC index for the associated measurement quantity (e.g., for CA management purposes, such that the network can reconfigure CC set for SL and/or the transmitter UE can activate or deactivate CC). In another example, the other parameters may include a BWP ID for the associated measurement quantity. Including the BWP ID in the measurement report may allow BWP management, such that the network can reconfigure/change/add BWP set for the sidelink, and/or the transmitter UE can switch BWP via media access control (MAC)-control element (CE) or downlink control information (DCI), which may be invisible to NW, etc.

FIG. 5 illustrates a flow chart of an example of a method 500 for forwarding an RRM configuration. In an example, a UE (e.g., UE 104-a, as a transmitter UE in sidelink communications) can perform the functions described in method 400 using one or more of the components described in FIGS. 1 and 2.

In method 500, optionally at Block 502, a configuration of resources for a sidelink channel can be received from a base station. In an aspect, configuration processing component 252, e.g., in conjunction with processor(s) 212, memory 216, transceiver 202, communicating component 242, etc., can receive, from the base station (e.g., base station 102), the configuration of resources for the sidelink channel. In an example, configuration processing component 252 can receive the configuration or resources as over a SLRB configured by the network via RRC signaling. For example, in resource allocation mode 1, configuration processing component 252 can receive scheduled resources for transmitting sidelink communications from the UE 104 to another UE (e.g., a receiver UE), which may be based on a request transmitted from the UE 104 to the base station 102 for the sidelink resources. In resource allocation mode 1, resources can be configured by the network via RRC in this regard, such that there may not be autonomous resource selection by the UE 104. Communicating component 242 can accordingly transmit sidelink communications to the receiver device over the scheduled resources, in some examples.

In method 500, at Block 504, a RRM configuration for measuring and reporting signals received from one or more devices in sidelink resources can be received. In an aspect, configuration processing component 252, e.g., in conjunction with processor(s) 212, memory 216, transceiver 202, communicating component 242, etc., can receive the RRM configuration for measuring signals received from one or more devices in sidelink resources. In an example, configuration processing component 252 can receive the RRM configuration from a base station (e.g., base station 102, in RRC signaling, broadcast signaling or SIB, etc., as described above). For example, configuration processing component 252 can receive the RRM configuration in RRCReconfiguration via Uu RRC (e.g., SRB1 or SRB3). As described, the RRM configuration can indicate parameters, instructions, etc. for measuring and reporting signals received from one or more devices in sidelink resources.

In method 500, at Block 506, the RRM configuration can be transmitted to a receiver device over a sidelink. In an aspect, configuration processing component 252, e.g., in conjunction with processor(s) 212, memory 216, transceiver 202, communicating component 242, etc., can transmit, to the receiver device over the sidelink, the RRM configuration. For example, configuration processing component 252 can transmit the RRM configuration (e.g., or at least a portion of parameters from the RRM configuration) to the receiver device (e.g., receiver UE) over the sidelink (e.g., using PC5 RRC signaling). Moreover, for example, configuration processing component 252 can store the RRM configuration to allow UE 104 to perform RRM measurement and reporting as well (e.g., as described in conjunction with method 400 above). In any case, transmitting the RRM configuration to receiver UE(s) can enable the receiver UE(s) to perform RRM measurements and reporting for the sidelink, as described above, based on which the base station 102 (e.g., in resource allocation mode 1) can reconfigure parameters for sidelink communications.

In method 500, optionally at Block 508, an indication of a reconfiguration or release of resources corresponding to the sidelink channel can be received from the base station. In an aspect, configuration processing component 252, e.g., in conjunction with processor(s) 212, memory 216, transceiver 202, communicating component 242, etc., can receive, from the base station, the indication of the reconfiguration or release of resources corresponding to the sidelink channel. In one example, the base station can transmit the indication to the UE 104 (e.g., as the transmitter UE) based on a report of RRM measurements over a sidelink received from the receiver device to which the RRM configuration is transmitted by the UE 104. Thus, for example, the base station 102 can determine to modify the sidelink channel or corresponding resources configured to the transmitter UE based on the measurement report from the receiver UE, as described further herein. For example, the indication may indicate reconfiguration of PQI of SLRB, release of SLRB, RAT/interface reselection, Uu/SL path reselection, etc.

In method 500, optionally at Block 510, one or more parameters for communications over the sidelink can be modified based on the indication. In an aspect, configuration processing component 252, e.g., in conjunction with processor(s) 212, memory 216, transceiver 202, communicating component 242, etc., can modify, based on the indication, one or more parameters for communications over the sidelink channel. For example, configuration processing component 252 can modify resources over which sidelink channel communications to the receiver UE can occur based on the reconfigured PQI of the SLRB, the release of some SLRB, etc., which may be received in an indication from the base station, as described above. In another example, configuration processing component 252 can modify a RAT or interface used over the sidelink channel, a Uu path to the base station (e.g., for the transmitter UE or receiver UE), a sidelink path to the receiver UE, etc.

FIG. 6 illustrates a flow chart of an example of a method 600 for configuring UEs to perform RRM measurements over a sidelink. In an example, a base station (e.g., base station 102 or other network component) can perform the functions described in method 600 using one or more of the components described in FIGS. 1 and 3.

In method 600, at Block 602, a RRM configuration for measuring and reporting signals received from one or more devices in sidelink resources can be transmitted. In an aspect, configuring component 342, e.g., in conjunction with processor(s) 312, memory 316, transceiver 302, etc., can transmit the RRM configuration for measuring and reporting signals received from one or more devices in sidelink resources. As described, in an example, configuring component 342 can transmit the RRM configuration (and/or a portion thereof) to a transmitter UE and/or a receiver UE using RRC signaling. In another example, configuring component 342 can broadcast the RRM configuration (and/or a portion thereof) to multiple UEs using SIB or other broadcast mechanisms, etc. In addition, for example, the RRM configuration can include one or more parameters related to measuring transmitter UEs over a sidelink, as described above, such as a periodic timer, trigger or other event detection parameters, L3 filter coefficient(s), report quantities, etc.

In an example, in transmitting the RRM configuration at Block 602, optionally at Block 604, the RRM configuration can be transmitted to a transmitter device for forwarding to a receiver device over a sidelink. In an aspect, configuring component 342, e.g., in conjunction with processor(s) 312, memory 316, transceiver 302, etc., can transmit the RRM configuration to the transmitter device (e.g., a UE 104-*a*) for forwarding to a receiver device (e.g., a UE 104-*b*) over a sidelink. For example, configuring component 342 can transmit the RRM configuration to the transmitter UE using RRC signaling. The transmitter UE can receive the RRM configuration and can forward or transmit at least a portion of the configuration to the receiver UE using PC5 RRC, as described.

In another example, in transmitting the RRM configuration at Block 602, optionally at Block 606, the RRM configuration can be transmitted to the receiver device. In an aspect, configuring component 342, e.g., in conjunction with processor(s) 312, memory 316, transceiver 302, etc., can transmit the RRM configuration to the receiver device. For example, configuring component 342 can transmit the RRM configuration to the receiver device using RRC signaling, and/or can broadcast the RRM configuration to multiple devices, including the receiver device. In one example, configuring component 342 may transmit portions of the RRM configuration using different types of signaling (e.g., broadcast some parameters, transmit others over RRC, etc.).

In method 600, at Block 608, a report of one or more signal parameters of signals measured by the device from the one or more other devices can be received from a device based on the RRM configuration. In an aspect, report processing component 352, e.g., in conjunction with processor(s) 312, memory 316, transceiver 302, configuring component 342, etc., can receive, from the device (e.g., the receiver device) and based on the RRM configuration, the report of one or more signal parameters of signals measured by the device, where the signals are measured by the device from the one or more other devices (e.g., one or more transmitter devices). For example, report processing component 352 can receive the report based on parameters in the RRM configuration (e.g., based on a periodicity or other event detection, based on L3 filter coefficients, based on report quantities to be indicated in the report, etc.). Moreover, as described, the report can include various reported parameters, including a transmitter UE identifier to which measured signals correspond, measurement quantities (e.g., cell or beam RSRP, RSRQ, SINR, CBR, etc.), CC index for associated measurement quantity, BWP ID for the associated measurement quantity, etc., as described above. Report processing component 352 can perform one or more functions based on the received report (e.g., to modify sidelink communications).

In method 600, optionally at Block 610, an indication of a reconfiguration or release of resources corresponding to a sidelink channel can be transmitted based on receiving the report. In an aspect, report processing component 352, e.g., in conjunction with processor(s) 312, memory 316, transceiver 302, configuring component 342, etc., can transmit, based on receiving the report, the indication of the reconfiguration or release of resources corresponding to the sidelink channel. For example, report processing component 352 can determine to reconfigure or release resources of the sidelink (e.g., reconfigure PQI or other parameters of, or release, a SLRB) based on the measurement report. For example, where the receiver UE reports measurements of a current transmitter UE that are below a threshold or measurements of another transmitter UE that achieve a threshold, report processing component 352 can determine to reconfigure or release the SLRB of the current transmitter UE (e.g., in favor of a SLRB of another transmitter UE for the receiver UE). Report processing component 352 can indicate the reconfiguration or release of resources to the transmitter UE to facilitate the transmitter UE (or another transmitter UE) notifying the receiver UE of modification of resources.

In method 600, optionally at Block 612, at least one of a RAT or interface for a sidelink channel, a Uu path, or a sidelink path can be reselected based on receiving the report. In an aspect, report processing component 352, e.g., in conjunction with processor(s) 312, memory 316, transceiver 302, configuring component 342, etc., can reselect, based on receiving the report, at least one of the RAT or interface for sidelink channel, the Uu path, or the sidelink path. For example, this may include report processing component 352 instructing the transmitter UE to use a different RAT or interface for the sidelink channel, or a different sidelink path, which the transmitter UE can use in modifying communications with the receiver UE. In one example, this may include report processing component 352 determining to modify one or more beams used to communicate with the receiver UE (e.g., on the Uu path or sidelink path), and the configuring component 342 can accordingly modify the beam used by the base station 102 and/or can instruct the transmitter UE to modify a beam used to communicate with the receiver UE.

Figure 7:
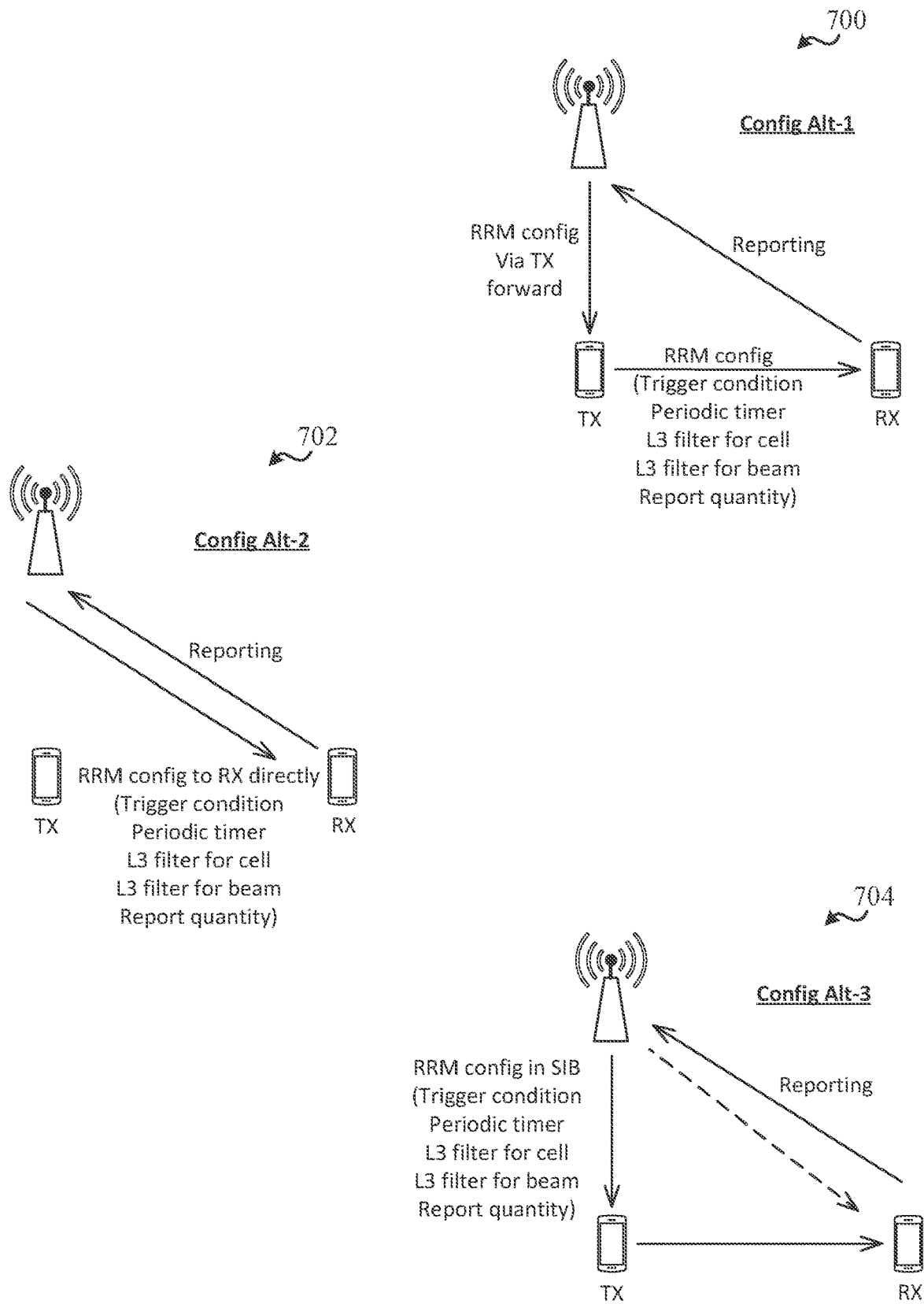
FIG. 7 illustrates a system for configuring radio resource management (RRM) measurements over sidelink resources, in accordance with various aspects of the present disclosure.

FIG. 7 illustrates examples of systems 700, 702, 704 for transmitting RRM configuration to a receiver UE. As described, in resource allocation mode 1, NW can take full control of RRM. Mode 1 works for CONNECTED UE. SLRB can be configured only by NW via RRC, in one example. For example, resource can be configured by NW via RRC, e.g., no UE autonomous resource selection. In system 700, for example, the measurement configuration procedure can include NW sending RRM configuration for SL to TX in RRCReconfiguration via Uu RRC (SRB1 or SRB3). Upon reception of measurement configuration from NW, SL TX stores and forwards it to its peer via PC5 RRC. In system 702, for example, measurement configuration procedure can include NW sending RRM configuration for SL to RX directly in RRCReconfiguration via Uu RRC (SRB1 or SRB3). In system 704, for example, measurement configuration procedure can include NW broadcasting RRM configuration for SL in SIB. Whenever a UE is Rx UE in a SL unicast connection, it can follow the measurement reporting procedure.

Figure 8:
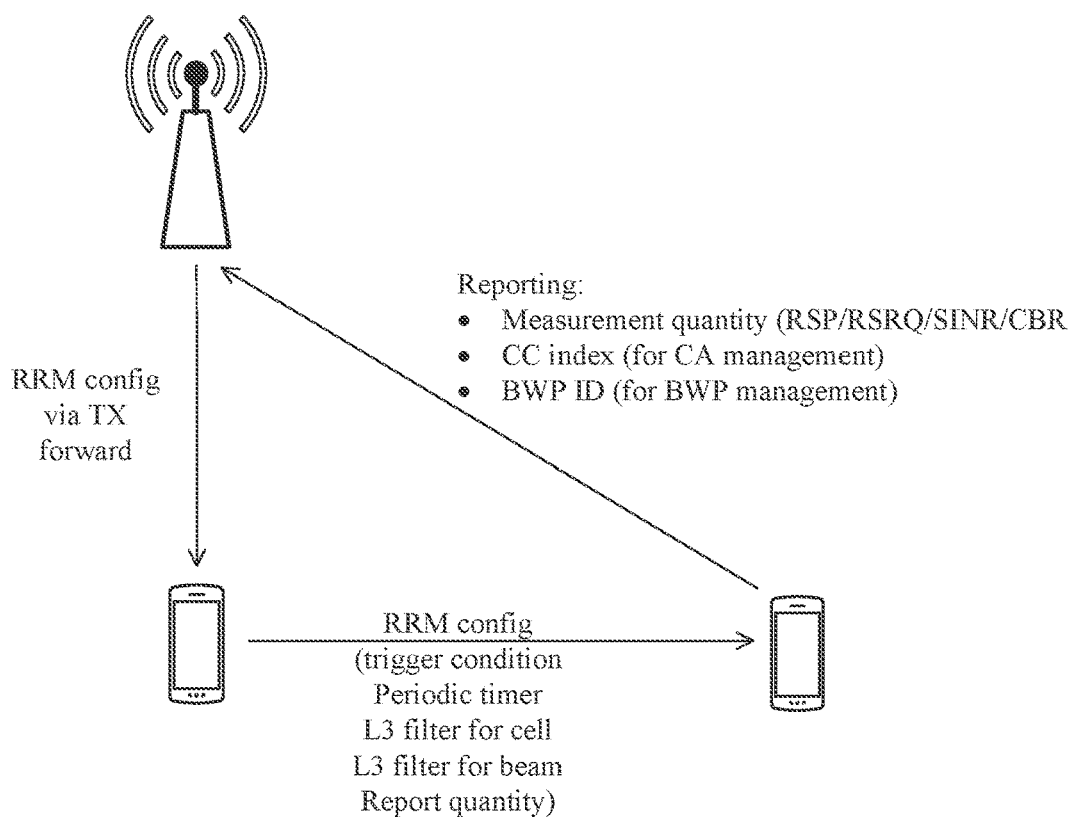
FIG. 8 illustrates a system for performing RRM measurements over sidelink resources, in accordance with various aspects of the present disclosure.

FIG. 8 illustrates an example of a system 800 for reporting RRM measurements. For example, when triggered/timer expires, SL RX reports available measurements to NW via measurementReport message. There may be no need to report the measurements to SL TX because NW can take full control in Mode1. The reporting contents include TX UE ID, Measurement quantities (e.g., available cell RSRP/RSRQ/SINR/CBR, available beam RSRP/RSRQ/SINR), CC index for the associated measurement quantity (e.g., for CA management purpose, NW reconfigure CC set for SL, where TX can activate or deactivate CC, etc.), BWP ID for the associated measurement quantity (for BWP management purpose, e.g. NW reconfigure/change/add BWP set for the sidelink, where TX UE can switch BWP via MAC-CE or DCI, which is invisible to NW), etc., as described. Upon reception of measurement reporting of SL, NW implementation can determine one or more actions to perform, such as reconfigure PQI of SLRB, release SLRB, RAT/interface reselection, or Uu/SL path re-selection, etc., as described.

Figure 9:
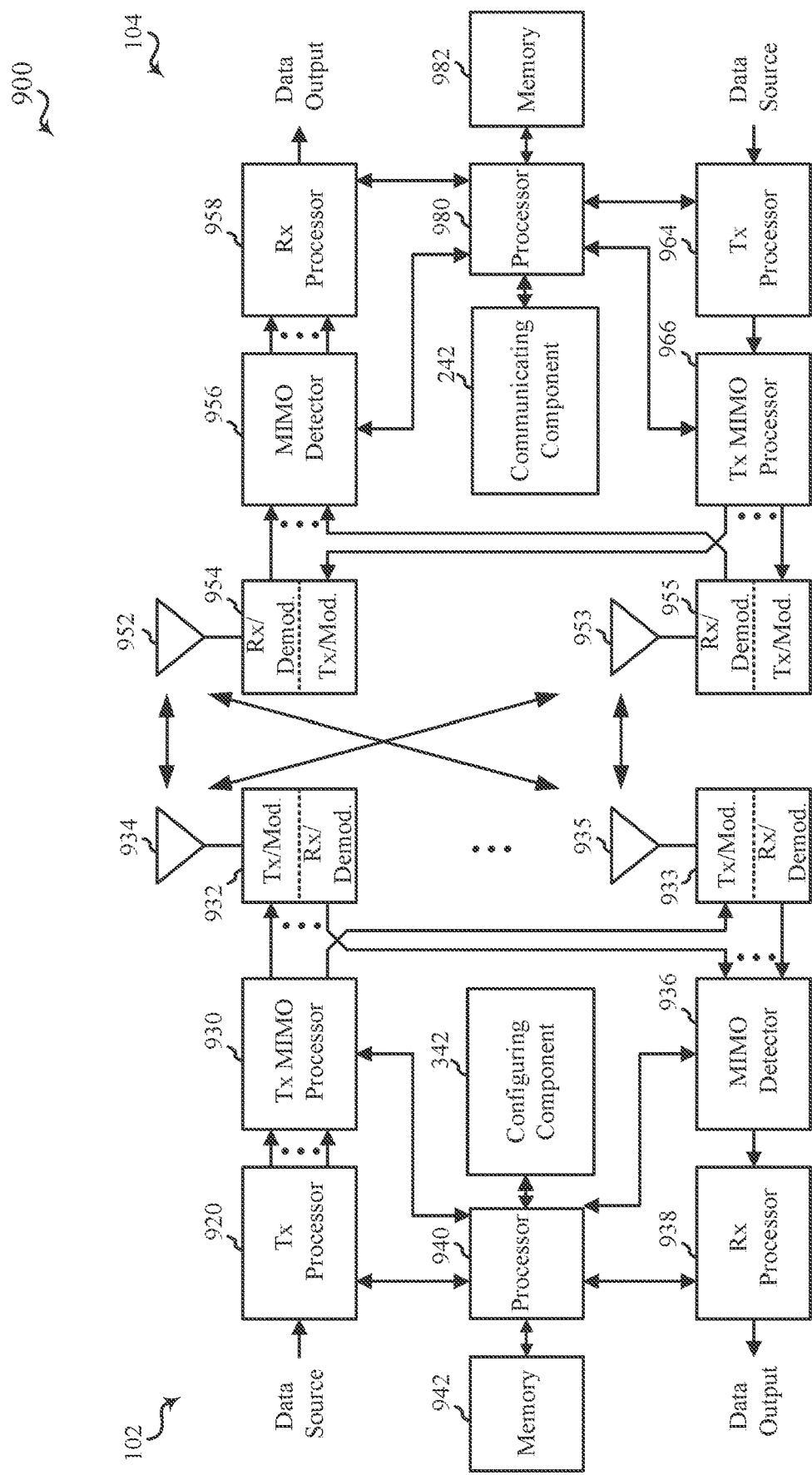
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104, in accordance with various aspects of the present disclosure. The MIMO communication system 900 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communication including receiving, by a first device, a radio resource measurement (RRM) configuration for measuring and reporting signals received from one or more devices in sidelink resources, measuring, based on the RRM configuration, signals received from the one or more devices, and transmitting, to a base station and based on the RRM configuration, a report of one or more signal parameters of the measured signals.

In Aspect 2, the method of Aspect 1 includes where\in receiving the RRM configuration comprises receiving the RRM configuration from a second device over a sidelink.

In Aspect 3, the method of Aspect 2 includes wherein receiving the RRM configuration comprises receiving the RRM configuration from the second device using PC5 radio resource control (RRC) signaling.

In Aspect 4, the method of any of Aspects 1 to 3 include wherein receiving the RRM configuration comprises receiving the RRM configuration from the base station.

In Aspect 5, the method of any of Aspects 1 to 4, include wherein receiving the RRM configuration comprises receiving the RRM configuration from the base station in radio resource control (RRC) signaling.

In Aspect 6, the method of any of Aspects 1 to 5 include wherein receiving the RRM configuration comprises receiving the RRM configuration from the base station in a system information block (SIB).

In Aspect 7, the method of any of Aspects 1 to 6 include wherein the RRM configuration indicates at least one of a periodic timer for periodic measuring and reporting of the signals received from the one or more devices, a trigger condition or event type for determining to measure and report the signals received from the one or more devices, a layer 3 filter coefficient for a cell or beam, or a report quantity to include in the reporting of the signals received from the one or more devices.

In Aspect 8, the method of any of Aspects 1 to 7 include wherein the report includes, for each of the one or more devices, at least one of a device identifier, a component carrier index for one of the one or more signal parameters, or a bandwidth part (BWP) identifier for one of the one or more signal parameters.

Aspect 9 is a method for wireless communication including receiving, by a first device and from a base station, a radio resource measurement (RRM) configuration for measuring and reporting signals received from one or more devices in sidelink resources, and transmitting, by the first device and to a second device over a sidelink channel, the RRM configuration.

In Aspect 10, the method of Aspect 9, includes receiving, from the base station, a configuration of resources for the sidelink channel.

In Aspect 11, the method of any of Aspects 9 or 10 include wherein receiving the RRM comprises receiving the RRM in radio resource control (RRC) signaling.

In Aspect 12, the method of any of Aspects 9 to 11 include wherein transmitting the RRM configuration comprises transmitting the RRM configuration using PC5 radio resource control (RRC) signaling.

In Aspect 13, the method of any of Aspects 9 to 12, include wherein the RRM configuration indicates at least one of a periodic timer for periodic measuring and reporting of the signals received from the one or more devices, a trigger condition or event type for determining to measure and report the signals received from the one or more devices, a layer 3 filter coefficient for a cell or beam, or a report quantity to include in the reporting of the signals received from the one or more devices.

In Aspect 14, the method of any of Aspects 9 to 13 include receiving, from the base station and based on a report from the second device, an indication of a reconfiguration or release of resources corresponding to the sidelink channel.

Aspect 15 is a method for wireless communication including transmitting a radio resource measurement (RRM) configuration for measuring and reporting signals received from one or more devices in sidelink resources, and receiving, from a device and based on the RRM configuration, a report of one or more signal parameters of signals measured by the device from the one or more devices.

In Aspect 16, the method of Aspect 15 includes wherein transmitting the RRM configuration comprises transmitting the RRM configuration to a transmitting device for forwarding to the device over a sidelink.

In Aspect 17, the method of Aspect 16 includes wherein transmitting the RRM configuration comprises transmitting the RRM configuration to the transmitting device using radio resource control (RRC) signaling.

In Aspect 18, the method of any of Aspects 15 to 17 include wherein transmitting the RRM configuration comprises transmitting the RRM configuration to the device using radio resource control (RRC) signaling.

In Aspect 19, the method of any of Aspects 15 to 18 include transmitting the RRM configuration comprises broadcasting the RRM configuration in a system information block (SIB).

In Aspect 20, the method of any of Aspects 15 to 19 include wherein the RRM configuration indicates at least one of a periodic timer for periodic measuring and reporting of the signals received from the one or more devices, a trigger condition or event type for determining to measure and report the signals received from the one or more devices, a layer 3 filter coefficient for a cell or beam, or a report quantity to include in the reporting of the signals received from the one or more devices.

In Aspect 21, the method of any of Aspects 15 to 20 include wherein the report includes, for each of the one or more devices, at least one of a device identifier, a component carrier index for one of the one or more signal parameters, or a bandwidth part (BWP) identifier for one of the one or more signal parameters.

In Aspect 22, the method of any of Aspects 15 to 21 include transmitting, based on receiving the report, an indication of a reconfiguration or release of resources corresponding to a sidelink channel.

In Aspect 23, the method of any of Aspects 15 to 22 include reselecting, based on receiving the report, at least one of a radio access terminal (RAT) or interface for a sidelink channel, a Uu path, or a sidelink path.

Aspect 24 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 23.

Aspect 25 is an apparatus for wireless communication including means for performing the operations of one or more methods in any of Aspects 1 to 23.

Aspect 26 is a computer-readable medium including code executable by one or more processors to perform the operations of one or more methods in any of Aspects 1 to 23.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving, by a first device, a radio resource measurement (RRM) configuration for measuring and reporting signals received from one or more devices in sidelink resources;
   receiving, by the first device and from a second device over a sidelink, an indication to switch communications from one of:
   a first component carrier to a second component carrier; or
   a first bandwidth part (BWP) to a second BWP;
   measuring, based on the RRM configuration, signals received from the one or more devices over the second component carrier or the second BWP; and
   transmitting, to a base station and based on the RRM configuration, a report of one or more signal parameters of the measured signals, wherein the report includes an identifier of the second device and at least one of a component carrier index of the second component carrier, or a BWP identifier of the second BWP.

2. The method of claim 1, wherein receiving the RRM configuration comprises receiving the RRM configuration from the second device over the sidelink.

3. The method of claim 2, wherein receiving the RRM configuration comprises receiving the RRM configuration from the second device using PC5 radio resource control (RRC) signaling.

4. The method of claim 1, wherein receiving the RRM configuration comprises receiving the RRM configuration from the base station.

5. The method of claim 1, wherein receiving the RRM configuration comprises receiving the RRM configuration from the base station in radio resource control (RRC) signaling.

6. The method of claim 1, wherein receiving the RRM configuration comprises receiving the RRM configuration from the base station in a system information block (SIB).

7. The method of claim 1, wherein the RRM configuration indicates at least one of a periodic timer for periodic measuring and reporting of the signals received from the one or more devices, a trigger condition or event type for determining to measure and report the signals received from the one or more devices, a layer 3 filter coefficient for a cell or beam, or a report quantity to include in the reporting of the signals received from the one or more devices.

8. An apparatus for wireless communication, comprising:
a transceiver;
a memory configured to store instructions; and
one or more processors communicatively coupled with the transceiver and the memory, wherein the one or more processors are configured to:
receive a radio resource measurement (RRM) configuration for measuring and reporting signals received from one or more devices in sidelink resources;
receive, from a second apparatus over a sidelink, an indication to switch communications from one of:
a first component carrier to a second component carrier; or
a first bandwidth part (BWP) to a second BWP;
measure, based on the RRM configuration, signals received from the one or more devices over the second component carrier or the second BWP; and
transmit, to a base station and based on the RRM configuration, a report of one or more signal parameters of the measured signals, wherein the report includes an identifier of the second device and at least one of a component carrier index of the second component carrier, or a BWP identifier of the second BWP.

9. The apparatus of claim 8, wherein the one or more processors are configured to receive the RRM configuration from the second apparatus over the sidelink.

10. The apparatus of claim 9, wherein the one or more processors are configured to receive the RRM configuration from the second apparatus using PC5 radio resource control (RRC) signaling.

11. The apparatus of claim 8, wherein the one or more processors are configured to receive the RRM configuration from the base station.

12. The apparatus of claim 8, wherein the one or more processors are configured to receive the RRM configuration from the base station in radio resource control (RRC) signaling.

13. The apparatus of claim 8, wherein the one or more processors are configured to receive the RRM configuration from the base station in a system information block (SIB).

14. The apparatus of claim 8, wherein the RRM configuration indicates at least one of a periodic timer for periodic measuring and reporting of the signals received from the one or more devices, a trigger condition or event type for determining to measure and report the signals received from the one or more devices, a layer 3 filter coefficient for a cell or beam, or a report quantity to include in the reporting of the signals received from the one or more devices.

\* \* \* \* \*